Patented June 20, 1933

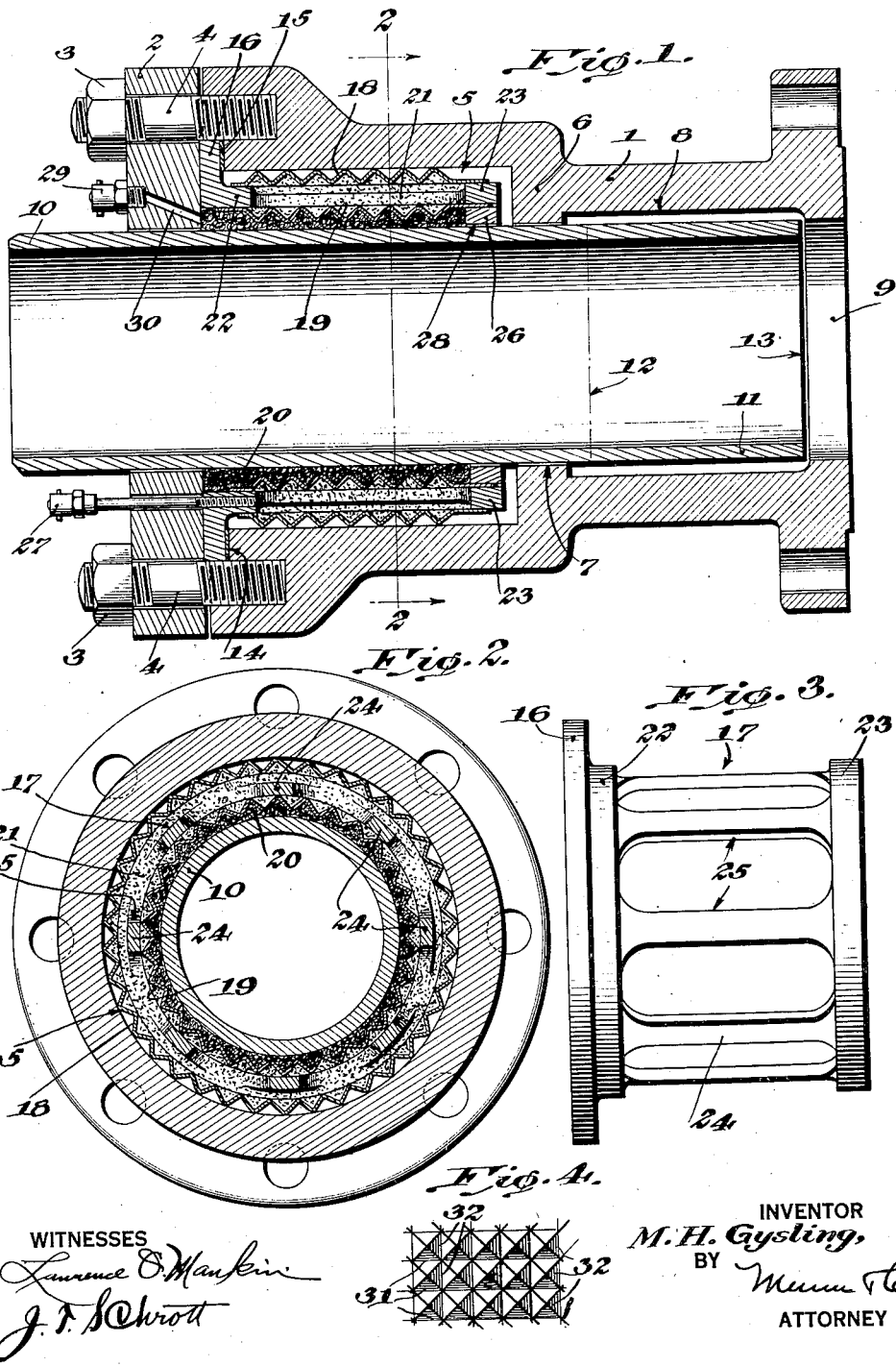

1,914,741

UNITED STATES PATENT OFFICE

MANUEL H. GYSLING, OF NORTH TONAWANDA, NEW YORK, ASSIGNOR OF ONE-HALF TO SIMON E. DOCKSTADER, OF CHICAGO, ILLINOIS

EXPANSION JOINT

Application filed January 19, 1932. Serial No. 587,582.

This invention relates to improvements in expansion joints, and although applicable to a variety of purposes as later brought out, is herein illustrated according to one embodiment, the objects in this and other embodiment being as follows:—

First, to make a leak-proof joint which will act with equal effectiveness against a movable, reciprocating or revolving pipe or rod.

Second, to provide an expansion joint in which the important feature comprises an element which is made to act upon a packing substance around a pipe (herein chosen for example) said element being subject to pressure which may be applied in any one or combination of several different ways so as, in turn, to exercise an annular squeezing action or pressure on said packing substance to make a leak-proof joint with said pipe.

Third, to provide a closed container, which is to be identified as the foregoing element, with a filling of plastic, incompressible substance, said container being either subject to external fluid pressure in a determined way, or the filling subject to expansion by an increase in temperature, or said filling being subject to expansion by virtue of having more of it forced into the container, any one or combination of the foregoing factors being utilized as a means of exercising a compression action on a packing substance around the pipe.

A further object of the invention is to provide an expansion joint for mechanical contrivances in which a member is movable under the influence of pressure fluid which is either associated with said contrivance or constitutes the motive power for its operation, said joint embodying an element which is caused to be flexed either by the pressure of a portion of said fluid or by the heat of said fluid, or a combination of the two, so as to exert a compressible force around and upon said member to provide a leak-proof joint.

Other objects and advantages will appear in the following specification, reference being had to the accompanying drawing in which Figure 1 is a longitudinal section of the improved expansion joint, Figure 2 is a cross section taken on the line 2—2 of Figure 1, Figure 3 is an elevation of the so-called bellows cage, in other words the foundation of the foregoing closed container, Figure 4 is a fractional elevation of a portion of the bellows metal, particularly illustrating how it is corrugated both longitudinally and transversely.

There are many mechanical contrivances which, while in operation or use, are subject to varying and sometimes inordinate degrees of expansion due to heat. This is particularly true of pipe lines such as used for conducting steam from a central power plant to buildings and the like. Such a pipe line will develop a comparatively large degree of linear expansion, it not being uncommon for the amount of expansion to reach 8" for 200' of piping.

This unconquerable propensity toward expansion requires the use of an expansion joint somewhere in the pipe line so that the linear motion may be taken up or compensated for and thus avoid the rupturing of the terminal connections of the pipe line or the doing of other possible damage. Expansion joints, in general, are acknowledged as being commonly known, but the fundamental purpose of the instant joint is to provide an element which is capable of being activated either by heat or pressure, or both, to exercise a compressing effect upon a packing substance so as to establish a leak-proof joint.

This principle is best understood from the drawing to which reference is now made. A body 1 may be regarded as part of any known type of expansion joint. It includes a cap 2 which is secured by nuts 3 screwed down on the ends of studs 4. The body 1 has a rather pronounced steam chamber 5, one end wall 6 of which has a sufficiently over-sized opening 7 to admit steam or other pressure fluid from a minor chamber 8 which has direct communication at 9 with the main volume of pressure fluid flowing in one or the other direction in the pipe line.

This pipe line is represented by the section 10, and it is around this section at the place previously denoted 7 that the pressure fluid enters the chamber 5. It is clear that pressure fluid in the pipe section 10 would pass around the free terminal 11 and so ultimately enter the chamber 5 as already pointed out.

The foregoing minor chamber 8 provides room for the linear expansion of the pipe section 10. When the pipe section is cold the end of the terminal 11 will be stationed approximately at the line 12. When the section 10 becomes heated the end of the terminal may stand at any position between the line 12 and the place denoted 13, the latter being regarded as the virtual limit of expansion of the pipe section 10.

A recess 14 in that end of the body 1 confronting the cap 2 first receives a ring gasket 15 and then the flange 16 of a cage 17 (Fig. 3), which is to be regarded as the foundation of a pair of bellows 18, 19, comprising the chief components of an element which so acts upon a volume of packing substance 20 as to keep that substance in continuous contact with the pipe section 10 and thereby form a leakproof joint.

It is the foregoing element which is herein regarded as the principal feature of the invention, and at this point it is desired to digress for a moment in order to make it clear that the use of this element is not confined to the compression of the packing substance 20 around the pipe section 10 alone. It is capable of being used in conjunction with any gradually moving member such as the pipe section 10 which is subject to slow, linear expansion or contraction, or with a continually reciprocating pipe or rod, for instance the piston rod of a locomotive, or with a revolving rod or shaft, for instance the shaft of a centrifugal pump or steam turbine.

Now the foregoing element will act in any of these connections and its specific structure is as follows:—A filling 21 of some plastic incompressible substance is made to occupy the space defined by the bellows 18, 19 and the remote ring portions 22, 23 of the cage 17 either in whole or in part. These ring portions are connected by a web 24 which is cut out in a number of places as at 25 so that the foregoing filling may constitute an integral body.

The ends of the bellows 18, 19 are securely fixed on the outside and inside of the ring portions 22, 23, thus providing a container for said filling 21 which is closed everywhere excepting at the fitting 27 through which more of the filling may be forced in. This fitting comprises a well known type of check valve such as used in automobile grease connections, and is normally closed. A suitable implement presented to the fitting 27 will open it while more of the filling substance is being forced in.

An internal ring 26 fits the ring portion 23 and provides an abutment for one end of the packing substance 20. This ring is over-sized to leave a channel at 28 for the admission of some pressure fluid from the chamber 5. The opposite end of the packing substance 20 abuts the cap 2, and when this cap is fastened in place it holds not only the packing substance but the flange 16 of the cage 17 and the ring gasket 15 as well. A fitting 29, similar to the fitting 27, is carried by the cap 2 and communicates with a duct 30 which leads to the packing substance 20 for lubricating purposes.

A fraction of the metal or other material from which the bellows 18, 19 are made is illustrated in Figure 4. This metal is corrugated both longitudinally as at 31 and transversely as at 32. These corrugations might run at angles other than right angles to each other, but in any event they are intended to make the bellows as elastic as possible in order to obtain the necessary variations in diameter and deflection without rupturing the metal when the bellows alter from positions under the application of pressure. A collateral function of the corrugations of the inner bellows 19 is to hold the packing substance 20 in place.

The operation is readily understood. The cage 17 with its carried bellows 18, 19 and filling 21 of plastic incompressible substance, must be collectively regarded as an element or an instrument for exercising pressure on the packing substance 20 so as to compress or squeeze that substance against and around the pipe section 10 so as to establish a leakproof joint. One end of this element is firmly anchored by virtue of having its flange 16 clamped between the body 1 and cap 2, which parts in themselves are to be considered as stationary.

Consider the pipe section 10 as part of a conduit full of steam or other pressure fluid. Some of this fluid will enter the minor chamber 8, pass through the opening 7 and occupy the chamber 5. Most of the pressure will be exerted on the outside bellows 18 which is the largest. Some pressure will be exerted on the inside bellows 19 by virtue of the fluid entering at the channel 28.

Thus there will be a pressure differential between the outer and inner bellows 18, 19. The pressure on the bellows 18 tends to force the packing material 20 toward the movable member 10, while the pressure acting outwardly on the inside bellows 19 tends to permit the packing 20 to leave the movable member 10.

The pressure on the outer bellows 18 is transmitted to the inner bellows 19 by the substance 21 which, as already stated, fills the container element either in whole or in part. Inasmuch as the outer bellows is the largest, the pressure transmitted by it predominates and so forces the packing substance 20 against the movable member 10.

The pressure differential, that is to say, the difference of pressure exerted on the outside bellows 18 and on the inside of the inner bellows 19 is readily computed as follows:—

The pressure per square inch on the bellows 18 forcing the packing substance 20 against the member 10 equals the pipe line pressure per square inch multiplied by the difference in mean circumference in inches between the inner and outer bellows and this result divided by the circumference in inches of the movable member 10. Consider the dimensions for a 3½" expansion joint:—

Mean diameter of the outside bellows 5¾"
Mean circumference 18.064"
Mean diameter of inside bellows 4⅝"
Mean circumference 14.53"
Outside diameter movable member 10, 4"
Circumference 12.5664"

Considering the fluid in the pipe line to be under 100 lbs. pressure per square inch, the pressure holding the packing substance 20 to the movable member 10 is 28.122 lbs. per square inch.

The packing substance 20 is subject to compression against the movable member 10 from another source. The substance 21 will expand, due to an increase in temperature, and in thus filling the space between the bellows will press inwardly on the bellows 19, the outer bellows abutting the peripheral wall of the chamber 5, and so compress the packing substance 20. Another source of pressure against the packing 20 is to force more of the substance 21 into the container 18, 19.

The longitudinal corrugations 31 (Fig. 4) afford the fluid pressure access to all peripheral parts of the bellows 18. The substance 21 will fill the container either in whole or in part depending on its character. Some plastic materials may be of such a nature as to require only a partial filling, the subsequent heating thereof being depended upon to expand it to the full volume of the container. Other plastic substances may be of such a nature that the container can be completely filled in the first instance. In either case more of the substance 21 may be forced in at the fitting 27, but the container is otherwise hermetically sealed and the substance is not supposed to escape after once being introduced, and when the fluid is admitted to the pipe line the action will be as follows:—

The fluid within the device being under greater pressure after the surrounding atmosphere causes it to attempt to escape to atmosphere. This is possible only by way of the joint between the packing material 20 and the movable member 10 on one side and the inner bellows 19 on the other side. When the fluid is first turned into the pipe system no pressure differential exists within the expansion joint, and the packing material 20 therefore contacts the movable member 10 and the inner bellows 19 loosely.

Due to this condition a slight leakage into the atmosphere will occur through the joints at this time. As the piping system fills, the pressure builds up within the device, and the pressure differential within the expansion joint begins to act; in consequence of which the packing material 20 is squeezed against the movable member 10 by the inner bellows 19. This action exerts sufficient pressure to seal the foregoing joints between the packing 20 and movable member 10 on one side and the inner bellows 19 on the other side against the passage of liquid under pressure. When this point in the operation of the expansion joint is reached, the outward pressure against the packing and inner bellows existing up to this time is theoretically eliminated because the inward or squeezing pressure predominates.

It has already been pointed out that the specific embodiment of the expansion joint in a pipe line is intended to be only one illustration of its use. This illustration is not to be regarded as any restriction, because the invention can be employed to equally good advantage in other connections, and is to be considered capable of variation in its mechanical details so as not to be limited to the exact structure shown.

I claim:—

1. In an expansion joint having a stationary body with a pressure fluid chamber, a movable member in telescopic relationship to said body and being movable in respect thereto, and a packing substance surrounding a portion of said member; means which is caused to expand by the heat of the pressure fluid in said chamber thereby to exercise a compressive action against said packing substance.

2. In an expansion joint having a stationary body with a pressure fluid chamber, a movable member in telescopic relationship to said body and being movable in respect thereto, and a packing substance surrounding a portion of said member; a closed, annular, flexible container fitting around the packing substance and occuying the chamber, and a quantity of plastic incompressible substance situated in the container, expanding under the heat of the pressure fluid to cause one wall of the container to abut a wall of the chamber and the other wall of the container to flex toward the packing substance to exercise a compressive action thereof.

3. An expansion joint having a stationary body with a pressure fluid chamber, a movable member in telescopic relationship to the body and being movable in respect thereto; a packing surrounding a portion of said member, a closed container occupying the chamber and including spaced, flexible, concentric walls, one of the walls being applied to said packing, and a substance occupying the space between the walls transmitting the pressure of said fluid on one of the walls to the other wall to exercise a compressive force on said packing.

4. In an expansion joint having a stationary body with a pressure fluid chamber, a movable member in telescopic relationship to said body and being movable in respect thereto; a packing surrounding a portion of said member, an open-work cage anchored in said chamber, said open-work providing remote ring portions, concentric bellows of corrugated material secured to said ring portions to provide a hermetically sealed container, the inner bellows being applied to the packing and the outer bellows abutting the wall of the chamber, and a filling of plastic incompressible substance in said container being expansible under the heat of said fluid and also transmitting the pressure of said fluid on the outer bellows to the inner bellows thereby to exercise a compressive action on the packing.

5. In an expansion joint including a stationary body having a pressure chamber, a telescopic member which is movable in reference to the body, and a packing surrounding a portion of said member; an element situated in and subject to the pressure of fluid in said chamber to exercise a compression on said packing, said element including confronting walls which are corrugated longitudinally and transversely to render them flexible, the outer wall of said element abutting the circumferential wall of the chamber and having fluid pressure imposed thereon, and a filling in said element transmitting the pressure from the outer wall to the inner wall of said element and so to the packing.

6. In an expansion joint incuding a stationary body, a telescopic member which is movable in reference to the body, and a packing surrounding a portion of said member; a hollow element including concentric walls, one of which is applied to the packing, said walls being subject to external fluid pressure in said body but being flexible under said pressure according to a differential determined by their relative circumferential sizes.

MANUEL H. GYSLING.